United States Patent
Gerdts et al.

(10) Patent No.: US 11,704,783 B2
(45) Date of Patent: Jul. 18, 2023

(54) METHOD OF CLEANING AND IDENTIFYING DEFECTS IN WEARABLE ATTENUATION EQUIPMENT

(71) Applicant: Radiological Care Services, LLC, Indianapolis, IN (US)

(72) Inventors: Zachary Gerdts, Indianapolis, IN (US); Justin McKay, Carmel, IN (US); Carl B. Gerdts, Camby, IN (US); Trevor Petrisin, Carmel, IN (US); Parker Smith, Noblesville, IN (US)

(73) Assignee: Radiological Care Services, LLC, Indianapolis, IN (US)

( * ) Notice: Subject to any disclaimer, the term of this patent is extended or adjusted under 35 U.S.C. 154(b) by 61 days.

(21) Appl. No.: 17/233,789

(22) Filed: Apr. 19, 2021

(65) Prior Publication Data
US 2022/0335590 A1 Oct. 20, 2022

(51) Int. Cl.
*G06T 7/00* (2017.01)
*G06F 16/51* (2019.01)

(52) U.S. Cl.
CPC ............ *G06T 7/0002* (2013.01); *G06F 16/51* (2019.01); *G06T 2207/10081* (2013.01)

(58) Field of Classification Search
None
See application file for complete search history.

(56) References Cited

U.S. PATENT DOCUMENTS

| | | | |
|---|---|---|---|
| 2014/0032236 A1* | 1/2014 | Williams | G06Q 30/018 705/2 |
| 2016/0280403 A1* | 9/2016 | Colson | A61J 1/03 |
| 2018/0060876 A1* | 3/2018 | Farioli Brioschi | H05K 999/99 |
| 2020/0160497 A1* | 5/2020 | Shah | G06T 7/001 |
| 2021/0126972 A1* | 4/2021 | Lobner | G16Y 10/00 |

OTHER PUBLICATIONS

Written Opinion and International Search Report corresponding to International Application No. PCT/US2022/25019 dated Jul. 25, 2022. (11 Pages).

* cited by examiner

*Primary Examiner* — Tahmina N Ansari
(74) *Attorney, Agent, or Firm* — Maginot, Moore & Beck, LLP

(57) ABSTRACT

A method for processing a plurality of radiation protective garments includes receiving a plurality of radiation protective garments from a customer, scanning an identification tag of each received radiation protective garment to identify electronic identification data of each radiation protective garment, and automatically identifying a subset of the radiation protective garments that require performance testing by using the identification data to access a file history of each scanned radiation protective garment, the file history including a performance testing schedule. The method further includes using an x-ray scanning system to scan the subset of the radiation protective garments and to generate x-ray image data, automatically updating the file histories of the subset of the radiation protective garments to include the corresponding x-ray image data, and identifying defects in the corresponding radiation protective garment based on the x-ray image data.

17 Claims, 12 Drawing Sheets

FIG. 10

METHOD OF CLEANING AND IDENTIFYING DEFECTS IN WEARABLE ATTENUATION EQUIPMENT

FIELD

This disclosure relates to the field of personal protection equipment and, in particular, to the testing, cleaning, and sanitization of personal protection equipment, such as radiation protective garments.

BACKGROUND

Personal protection equipment ("PPE") is worn to minimize exposure to hazards that may cause injuries and illnesses. One type of PPE includes radiation protective garments that protect people and animals against the cumulative effects of radiation exposure, as occurs in medical, veterinary, and dental settings. Exemplary procedures during which radiation protective garments are worn include x-rays, computerized tomography scans (CT or CAT scans), and fluoroscopy. Radiation protective garments are made from lead-based and/or non-lead-based attenuation material that blocks and/or attenuates electromagnetic radiation. For example, during a procedure in which a patient receives an x-ray of her knee, the patient's torso is covered with a radiation protective garment (such as a lead apron) to minimize the patient's exposure to the radiation required to image the knee. The garment is placed on the patient like a blanket and then is removed from the patient following the x-ray procedure. The radiation protective garment prevents most or all of the radiation required to image the knee from passing through the garment so that the covered portions of the patient's body are exposed to less additional radiation.

Nationwide, concerns of hospital acquired infections are growing, which has brought attention to the upkeep, care, cleaning, and sanitization of radiation protective garments. Clinical studies have shown that radiation protective garments, if not properly maintained, harbor dangerous microorganisms that are passed from healthcare worker to patient or patient to healthcare worker, if the garments are not properly maintained. In particular, the surfaces of radiation protective garments collect contaminants during normal use, such as oils from skin, blood, dirt, hair, skin cells, microorganisms, casting materials, surgical debris/residue, and common radiological chemicals. A combination of these contaminating factors contributes to the formation of biofilms on the radiation protective garment, in addition to general soil and odor development. To complicate matters, the attenuation material that provides the protection against electrometric radiation is relatively delicate and care must be taken not to fold, crease, or otherwise damage the attenuation material. Moreover, unapproved cleaning agents should not be applied to radiation protective garments as some unapproved cleaning agents may damage the attenuation material, thereby invisibly reducing the effectiveness of the garment as a shield against radiation. Accordingly, specialized services and skills are require to properly clean and sanitize radiation protective garments.

The complexity of the cleaning task discussed in the foregoing paragraph has led some organizations to disregard the cleaning and service requirements of radiation protection garments. Alternatively, some organizations forego proper cleaning and sanitization and instead use simple sanitizers, such as disinfectant sprays and wipes, to "surface sanitize" radiation protective garments. According to the United States Center for Disease Control and Prevention ("CDC"), however, a true cleaning (i.e. the removal of contamination) is essential before sanitization can occur. As such, the "surface sanitization" of radiation protective garments is a largely ineffective procedure for reducing hospital acquired infections.

As an additional issue, some organizations includes tens or hundreds of radiation protective garments, thereby further complicating the process of properly cleaning, sanitizing, and maintaining the garments. For example, a hospital may include five departments each having twenty radiation protective garments. Typically, the hospital has no means of tracking the sanitization status and location of the radiation protective garments within the hospital and within each department. As such, it is difficult for the hospital to determine when a garment should be cleaned, inspected, repaired, and/or replaced.

Based on the above, it is desirable to protect patients and staff by properly cleaning, sanitizing, and maintaining radiation protective garments. Moreover, it is desirable to assist organizations, such as hospitals, in tracking and servicing radiation protective garments so that the cleaning, sanitizing, and maintaining is timely performed and with a minimal burden on the organization.

SUMMARY

According to an exemplary embodiment of the disclosure, a method for processing a plurality of radiation protective garments includes receiving a plurality of radiation protective garments from a customer, scanning an identification tag of each received radiation protective garment to identify electronic identification data of each radiation protective garment, and automatically identifying a subset of the radiation protective garments that require performance testing by using the identification data to access a file history of each scanned radiation protective garment, the file history including a performance testing schedule. The method further includes using an x-ray scanning system to scan the subset of the radiation protective garments and to generate x-ray image data, automatically updating the file histories of the subset of the radiation protective garments to include the corresponding x-ray image data, and identifying defects in the corresponding radiation protective garment based on the x-ray image data. The method also includes sanitizing the plurality of radiation protective garments, grouping the sanitized radiation protective garments identified as having defects in a first group, grouping the sanitized radiation protective garments without identified defects in a second group separate from the first group, and returning the plurality of radiation protective garments to the customer separated according to the first group and the second group.

According to another exemplary embodiment of the disclosure, a method for processing a plurality of radiation protective garments includes scanning an identification tag of each radiation protective garment of the plurality of radiation protective garments to identify electronic identification data of each radiation protective garment, automatically identifying a subset of the radiation protective garments that require performance testing by using the identification data to access a file history of each scanned radiation protective garment, the file history including a performance testing schedule, and configuring a graphical user interface to identify the radiation protection garments of the subset of the radiation protective garments to a technician. The method further includes using an x-ray scanning system to scan the subset of the radiation protective garments and to generate x-ray image data, automatically updating the file histories of the subset of the radiation protective garments to include the corresponding x-ray image data, and displaying images based on the x-ray image data on a display screen. The method also includes using an input device to generate annotation data that identifies defects in the corresponding radiation protective garment as displayed on the display screen, automatically updating the file histories of the corresponding radiation protective garments with the annotation data, and transmitting at least the identification data, the x-ray image data, and the annotation data over the Internet to a remote user, so that the remote user has immediate access to the identification data, the x-ray image data, and the annotation data.

According to a further exemplary embodiment of the disclosure, a method for processing a plurality of radiation protective garments includes scanning an identification tag of each radiation protective garment of the plurality of radiation protective garments to identify electronic identification data of each radiation protective garment, automatically identifying a subset of the radiation protective garments that require performance testing by using the identification data to access a file history of each scanned radiation protective garment, the file history including a performance testing schedule, configuring a graphical user interface to identify the radiation protection garments of the subset of the radiation protective garments to a technician, and using an x-ray scanning system to scan the subset of the radiation protective garments and to generate x-ray image data. The method further includes automatically updating the file histories of the subset of the radiation protective garments to include the corresponding x-ray image data and the date and time of the x-ray scanning, and cleaning the plurality of radiation protective garments by removing contamination from the radiation protective garments. The method also includes sanitizing the cleaned radiation protective garments by applying a sanitizer solution to all surfaces of the radiation protective garments, scanning the identification tag of each sanitized radiation protective garment to identify the electronic identification data and to determine packing instructions, and packing the sanitized radiation protective garments according to the packing instructions.

BRIEF DESCRIPTION OF THE FIGURES

The above-described features and advantages, as well as others, should become more readily apparent to those of ordinary skill in the art by reference to the following detailed description and the accompanying figures in which:

FIG. 6 is a screenshot of a GUI displayed on a display screen of a computer in the intake area of FIG. 2;

FIG. 7 is another screenshot of the GUI of FIG. 6;

FIG. 10 is a screenshot of a GUI displayed on a display screen of a computer in a checkout area of the service provider of FIG. 1;

DETAILED DESCRIPTION

Figure 1:
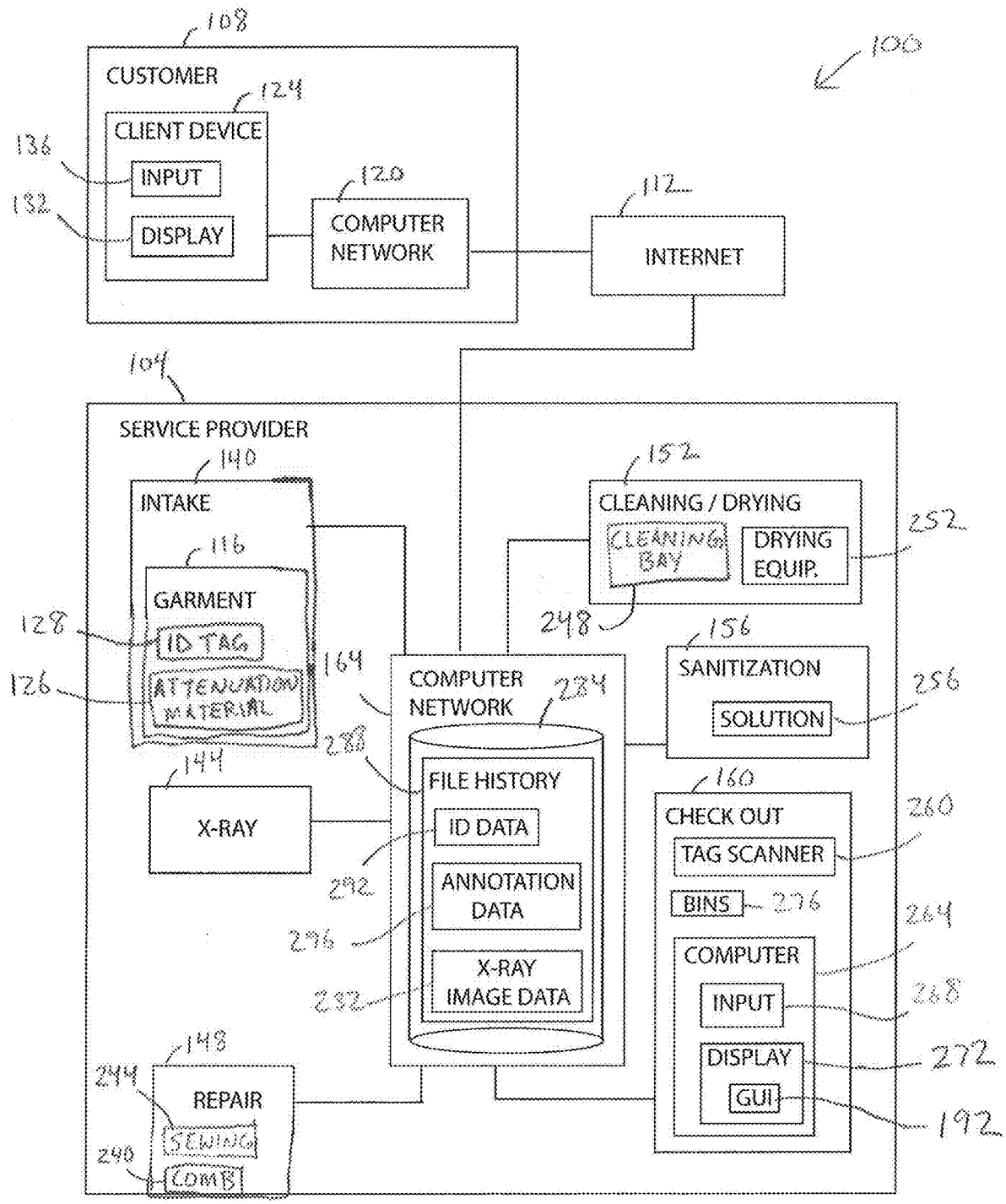
FIG. 1 is a block diagram of a system including a service provider that tests, cleans, repairs, and sanitizes radiation protection garments that are soiled by a customer.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1 a system 100 includes a service provider 104 that is operably connected to a customer 108 by the Internet 112. The service provider 104 is configured is to test, repair, clean, and sanitize radiation protective garments 116 that are used by the customer 108. The service provider 104 simplifies the task of auditing the radiation protective garments 116 by providing the customer 108 with detailed information regarding the performance of the radiation protective garments 116 at attenuating radiation, such as the ionizing radiation commonly referred to as x-rays. The service provider 104 also organizes the protective garments 116 to streamline the distribution of the repaired, cleaned, and sanitized protective garments 116 to the customer 108. Each element of the system 100 is described herein, along with a method 500 (FIG. 5) of operating the service provider 104 and a description of a graphical user interface ("GUI") 192 (FIGS. 6-8, 10, and 11) utilized by technicians and operators of the service provider 104.

The customer 108 has access to a computer network 120 operably connected to the Internet 112 and to a client device 124. In an exemplary embodiment, the customer 108 is a hospital, veterinary clinic, surgery center or other enterprise that utilizes the radiation protective garments 116. The customer 108 dirties and/or soils the protective garments 116 in such a way that the protective garments 116 must be cleaned and sanitized prior to being used again.

The client device 124 of the customer 108 is a smartphone, tablet computer, and/or a personal computer that includes a display screen 132 and corresponding input devices 136 such as a keyboard, mouse, camera, touchscreen, and/or microphone. The client device 124 is operably connected to the Internet 112 by the computer network 120. The customer 108 may include a plurality of the client devices 124. For example, multiple staff members in each department of a hospital may use a smartphone configured as the client device 124, and other staff members may use a personal computer configured as the client device 124. In other embodiments, the client device 124 is any other suitable computing device that electronically communicates over the Internet 112 and/or the computer network 120.

The radiation protective garment 116 includes all types of radiation protective clothing, gear, guards, and the like that is worn by patients and personnel to minimize the exposure of radiation. The radiation protective garment 116 is also referred herein as a protective garment, a garment, x-ray protective apparel, protective apparel, radiation protective clothing, wearable attenuation equipment, an x-ray garment, x-ray clothing, a lead apron, lead garments, and lead clothing. Exemplary protective garments 116 include, but are not limited to, ¾ aprons, ½ aprons, skirts, vests, gloves, hats, gowns, shirts, pants, and thyroid collars.

As shown in FIG. 1, the protective garments 116 include an attenuation material 126 and an identification tag 128. The attenuation material 126 is formed from a layer of lead or a lead substitute that is configured to attenuate radiation to a safe level and/or to completely prevents radiation from passing through the garment 116 (i.e. blocks the radiation). In a specific embodiment, the attenuation material 126 includes a polymer with metal bits dispersed throughout, such that the attenuation material 126 is flexible, durable, and blocks x-ray radiation. In other embodiments, the attenuation material 126 is formed from any other material(s) configured to attenuate radiation such as x-ray radiation. The attenuation material 126 is also referred to herein as an attenuation layer. The protective garment 116 also includes an outer layer that is at least one of cloth, nylon, plastic, or rubber. The outer layer of the protective garment 116 gets soiled during use and must be cleaned and sanitized prior to a subsequent use to prevent infections in subsequent patients.

Figure 9:
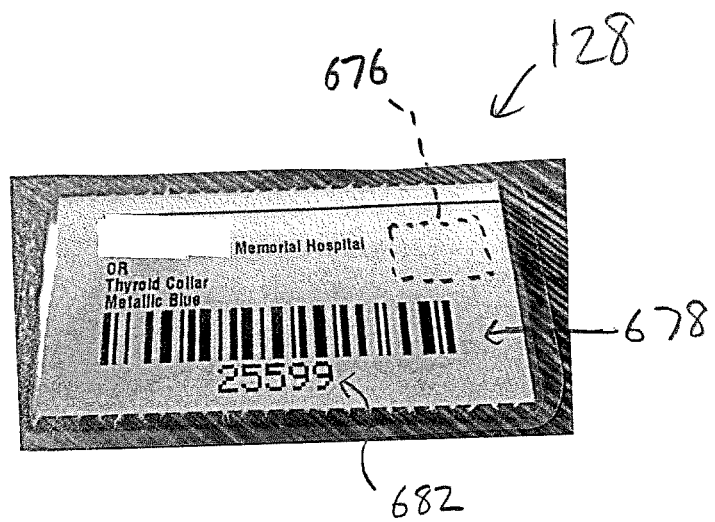
FIG. 9 illustrates an ID tag of the garments of FIG. 1.

The identification tag ("ID tag") 128 (see also FIG. 9) of the garment 116 is configured to uniquely identify the protective garment 116 to the customer 108 and to the service provider 104. In one embodiment, the ID tag 128 includes a radio frequency identification ("RFID") tag 676 (FIG. 9, shown in phantom) and a barcode 678 (FIG. 9) that encodes a unique alpha-numeric identification (i.e. a unique identifier 682 (FIG. 9)) of the protective garment 116. In one embodiment, the same unique identifier 682 is coded into the RFID tag 676 and the barcode 678. Accordingly, the garment 116 is configured to be uniquely identified using an RFID scanner, a barcode scanner, or a smartphone, such as the client device 124. The ID tag 128, in other embodiments, is provided as any type of electronically readable identification device.

With reference to FIG. 1, the service provider 104 includes an intake area 140, an x-ray area 144, a repair area 148, a cleaning and drying area 152, a sanitization area 156, and a checkout area 160 each of which may include electronic devices that are operably connected to a computer network 164. In one embodiment, the garments 116 are moved sequentially through the areas 140, 144, 148, 152, 156, 160. In other embodiments, the garments 116 move through the areas 140, 144, 148, 152, 156, 160 in any selected order or sequence. The areas 140, 144, 148, 152, 156, 160 may overlap with each other or may be spaced apart from each other. In an exemplary embodiment, the areas 140, 144, 148, 152, 156, 160 are representative of a process and may not be physically distinct from each other.

Figure 2:
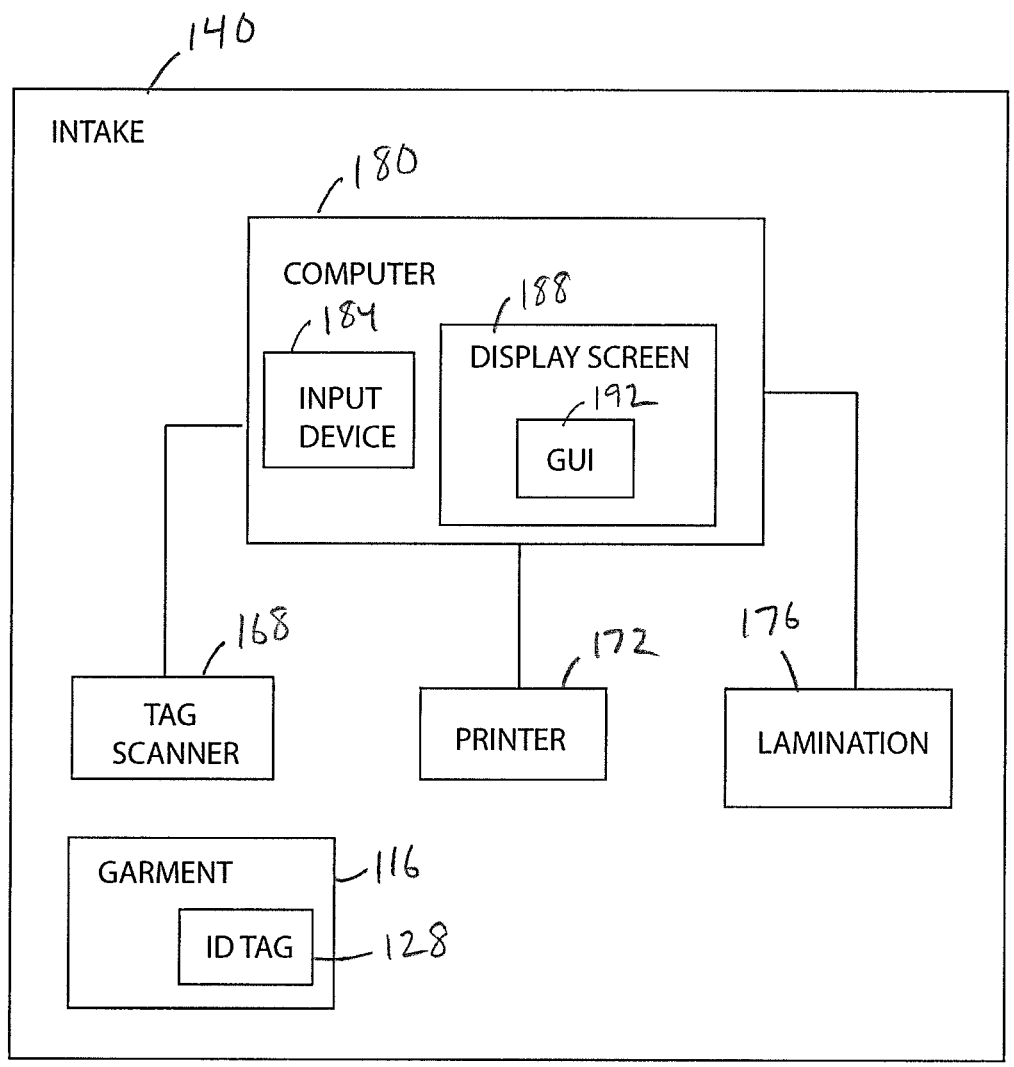
FIG. 2 is a block diagram of an intake area of the service provider of FIG. 1.

As shown in FIG. 2, the intake area 140 includes a tag scanner 168, a printer 172, and a lamination machine 176 operably connected to a computer 180. The tag scanner 168 is an RFID scanner and/or a barcode scanner. Accordingly, the tag scanner 168 is configured to scan the ID tag 128 and to extract the unique identifier 682 of the scanned protective garment 116. In one embodiment, the tag scanner 168 is a floor standing RFID scanner that defines a detection area encompassing about two square feet (2 ft$^2$). The large detection area ensures that the ID tag 128 is easily and conveniently scanned by the tag scanner 168 simply by waving the protective garment 116 in front of the tag scanner 168. In other embodiments, the tag scanner 168 is provided as any type of device configured to electronically read an identification device.

The printer 172 of the intake area 140 is configured to print and/or program new ID tags 128 for the protective garments 116 that do not presently have an ID tag 116 or that have a damaged ID tag 116. For example, when the service provider 104 processes a protective garment 116 for the first time, the garment 116 typically does not include an ID tag 128. Accordingly, a technician uses the computer 180 to assign the protective garment 116 the unique identifier 682. Then, the printer 172 encodes the RFID 676 of the new ID tag 128, and the printer 172 printers a corresponding barcode 678 on the new ID tag 128. In some embodiments, the intake area 140 includes a separate RFID encoder and printer. In an exemplary embodiment, the printer 172 is a Zebra ZT610 industrial printer.

In FIG. 2, the lamination machine 176 of the intake area 140 is configured to laminate the ID tags 128 printed by the printer 172. Plastic lamination protects the ID tags 128 from damage and also from the cleaning and sanitization process performed by the service provider 104. New ID tags 128 that are laminated by the lamination machine 176 are sewed or otherwise permanently fastened to the protective garment 116.

The computer 180 of the intake area 140 is operably connected to the computer network 164 and is provided, in one embodiment, as a personal computer. The computer 180 includes an input device 184 and a display screen 188 that displays the GUI 192. The GUI 192 is customized to service provider 104 and provides the technician working the intake area 140 with instructions and information related to the processing of the protective garments 116. In other embodiments, the computer 180 is any other suitable computing device such as a smartphone, tablet computer, and the like that electronically communicates over the Internet 112 and/or the computer network 164.

Figure 3:
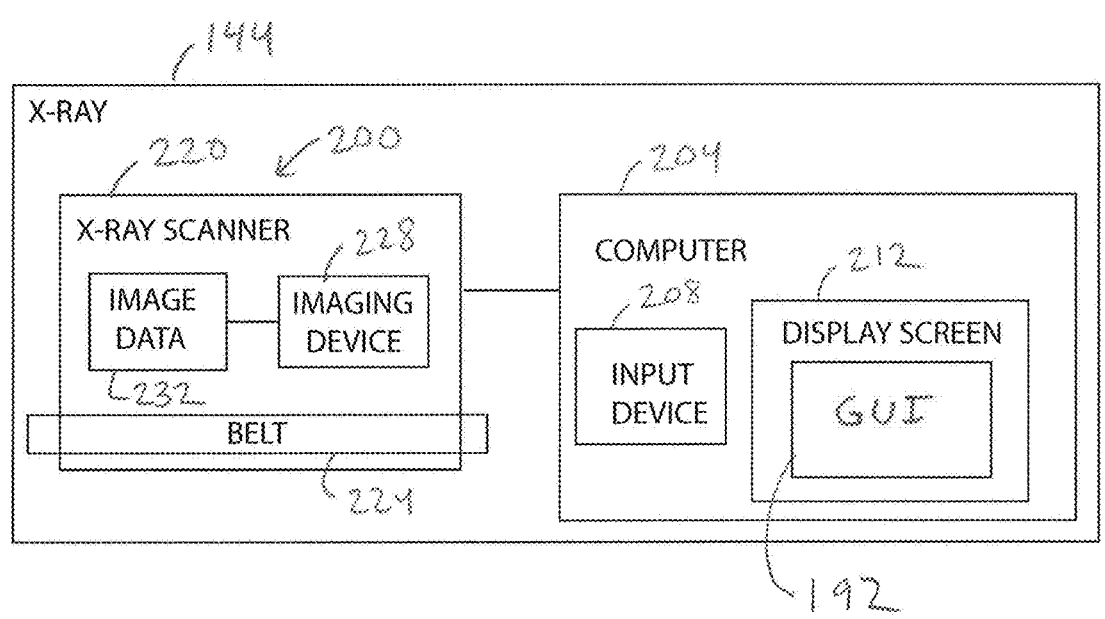
FIG. 3 is a block diagram of an x-ray area of the service provider of FIG. 1.

As shown in FIG. 3, the x-ray area 144 includes an x-ray scanner system 200 operably connected to a computer 204. The computer 204 includes an input device 208, such as a keyboard and mouse, and a display screen 212 that shows the GUI 192. In other embodiments, the computer 204 is any other suitable computing device such as a smartphone, tablet computer, and the like that electronically communicates over the Internet 112 and/or the computer network 164.

The x-ray scanner system 200 includes a housing 220 supporting a conveyer belt 224 and an imaging device 228. In one embodiment, the x-ray scanner system 220 includes or is based on a commercially available low-dose x-ray system, such as a mini c-arm, a small c-arm, and/or an x-ray system typically used to scan envelopes and packages in a mail facility. The belt 224 is configured to support a protection garment 116 and to automatically move the protection garment 116 through the housing 220 and past the imaging device 228. The imaging device 228 is an x-ray imaging device that generates x-ray image data 232 of the protection garment 116 on the belt 224. The x-ray scanner system 200 transmits the x-ray image data 232 to the computer 204 for display on the display screen 212 and for digital storage by the computer network 164.

Figure 4:
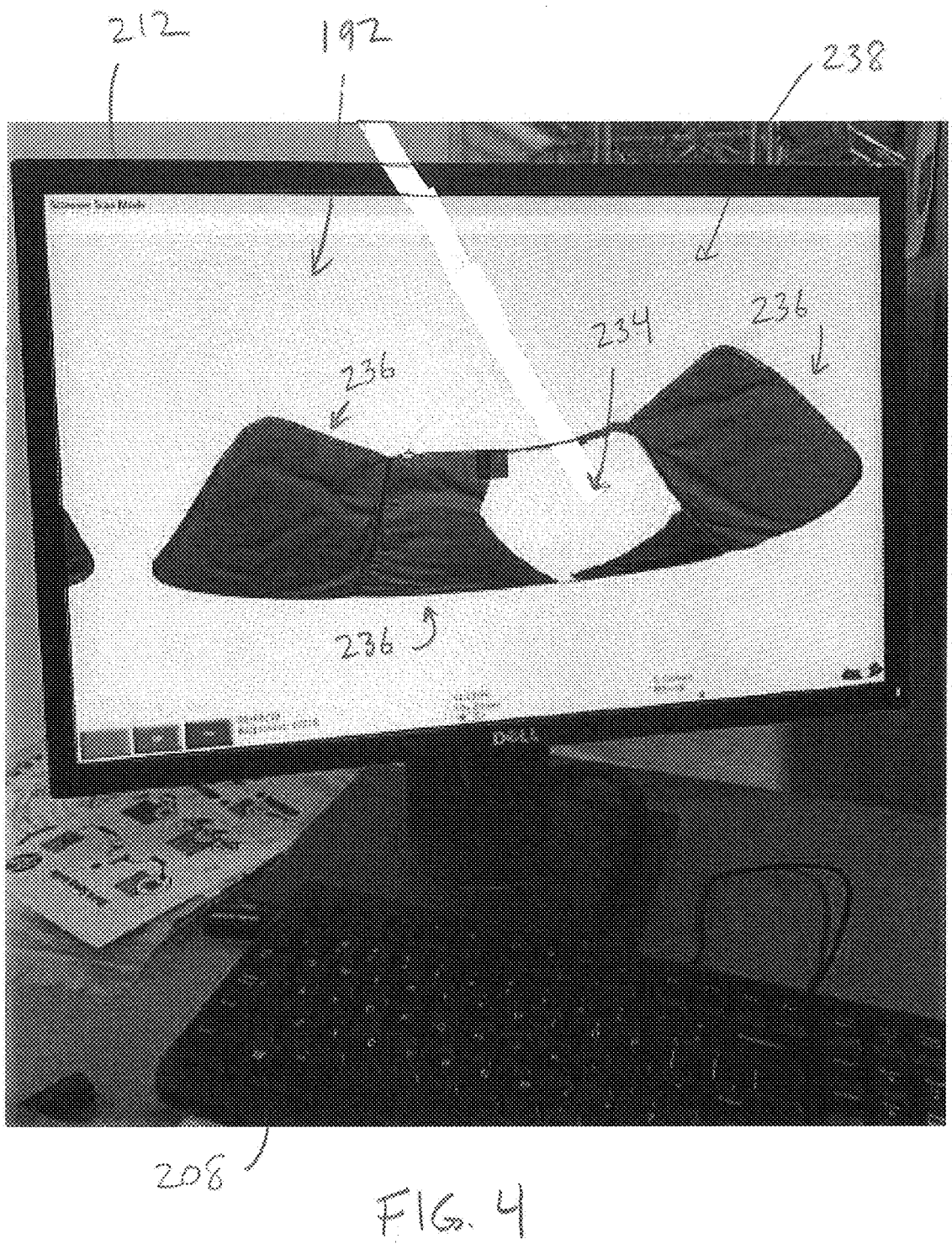
FIG. 4 illustrates a display screen of a computer used in the x-ray area of FIG. 3, the display screen shows a graphical user interface ("GUI") that identifies a defect in an x-ray scanned radiation protection garment.

As shown in FIG. 4, images 238 based on the x-ray image data 232 are displayed on the display screen 212. The x-ray image data 232 corresponds to a digital x-ray image 238 of the protection garment 116. In viewing the GUI 192 and the image 238, areas 236 of the protection garment 116 that block or attenuate x-rays are identified and easily distinguished from areas 234 of the protection garment 116 that fail to block or do not block x-rays. Determining the ability of the garment 116 to block and/or to attenuate x-rays is referred to herein as performance testing the garment 116. In the example of FIG. 4, the scanned protection garment 116 is a thyroid collar, and the area 234 (also referred to herein as defect 234) of the image 238 has failed to block x-rays, while the areas 236 of the image 238 have satisfactorily blocked or attenuated the x-rays. The area 234 is not a hole in the garment 116 that is visible with the naked eye, and is instead only a region of the garment 116 that passes x-rays from the imaging device 228.

Figure 12:
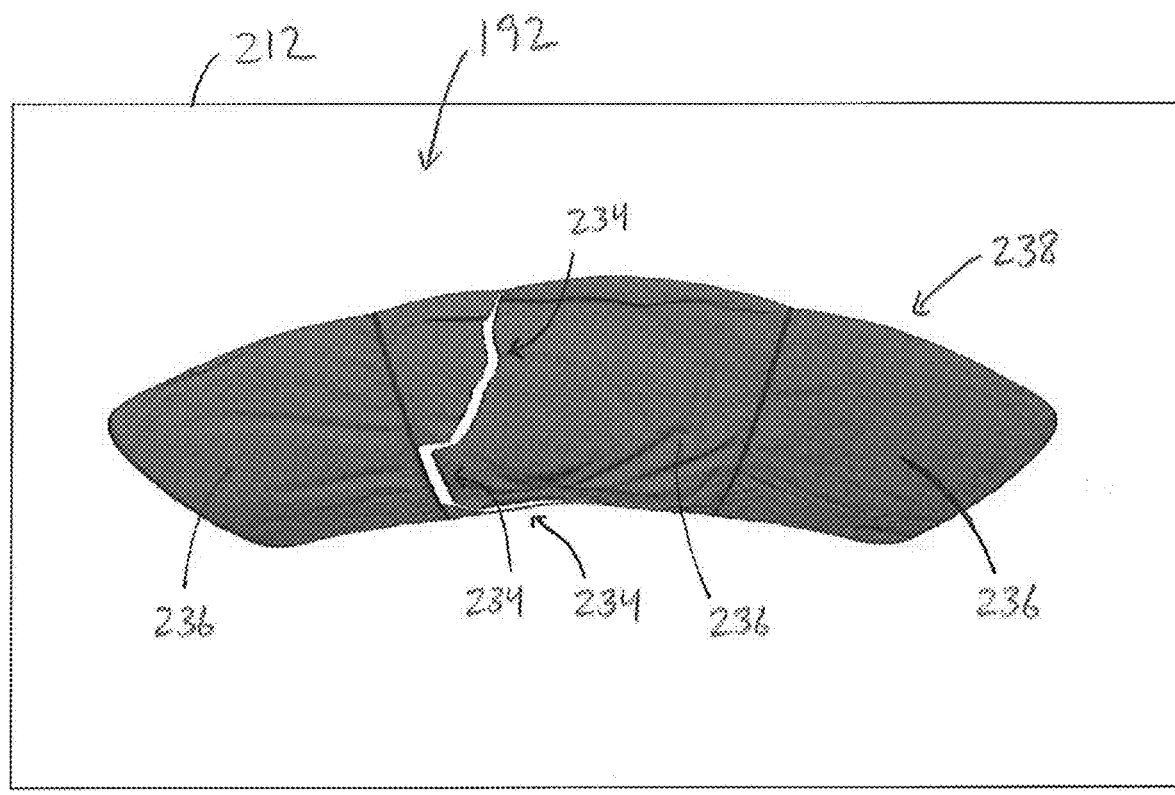
FIG. 12 illustrates the display screen of the computer used in the x-ray area of FIG. 3, the display screen shows the GUI that identifies a defect in an x-ray scanned radiation protection garment.

In FIG. 4, the defect 234 is a comparatively large region of the garment 116. In other embodiments, however, the detect 234 has any size and shape. For example, the defect 234 may be as small as a pinhole or even larger than the defect 234 shown in FIG. 4. Additionally, the defect 234 may be crack, a tear, a partial crack, a break, and/or a partial break in the attenuation material 126 of the garment 116, including a hairline crack. Accordingly, the defect 234 may correspond to a long and thin portion of the attenuation material 126 of the garment 116 that fails to attenuate x-rays sufficiently, as detected by the x-ray scanner system 200. As described herein, another defect 234 is shown in FIG. 12.

With reference again to FIG. 1, the repair area 148 of the service provider 104 includes tools, such as combs 240 and sewing machines 244 for repairing the protection garments 116. For example, the technician(s) may notice that hook and loop fastener portions (i.e. Velcro®) of the protection garment 116 are littered with debris and are not fully fastened to garment 116. In such an example, the technician at the repair area 148 uses the comb 240 or other fine bristle brush to clean the hook and loop fastener portions, and then uses the sewing machine 244 to attach properly the hook and loop fastener portions to the garment 116. The repair area 148 includes any other tool typically used to repair articles of apparel.

As shown in FIG. 1, the cleaning and drying area 152 includes a cleaning bay 248 and drying equipment 252 for cleaning and drying the protection garments 116. In the cleaning bay 248, cleaning solution and cleaning brushes are provided to thoroughly clean the protective garments 116. The cleaning process includes brushing or agitating fibers of the exterior layer of the garments 116 to remove substantially all of the debris and biofilm on the protective garments 116.

The drying equipment 252 is configured to dry the cleaned protective garments 116. The drying equipment 252 includes any combination of fans, heaters, and dehumidifiers as is required to create an area suitable for drying the cleaned protective garments 116.

In FIG. 1, the sanitization area 156 includes a sanitizer solution 256 for sanitizing the cleaned and dried protection garments 116. The sanitizer solution 256 is configured for application to all surfaces of the protection garments 116 for sanitizing the garments 116. The sanitizer solution 256 is selected so as to completely sanitize the protection garments 116 without damaging any surfaces and without damaging the attenuation material 126 of the protection garments 116. Sanitizing the garments 116 includes killing, deactivating, inactivating, destroying, and/or removing all or substantially of the biofilm, bacteria, viruses, and pathogens that may be on the garments 116.

The checkout area 160 of FIG. 1 includes another tag scanner 260, a computer 264 having an input device 268 and a display screen 272, as well as a plurality of totes, carriers, and/or containers referred to herein as bins 276. The checkout area 160 receives the sanitized garments 116 and a technician sorts and prepares the garments 116 for delivery to the customer 108 or for pickup by the customer 108. The display screen 272 of the computer 264 in the checkout area 160 is configured to display the GUI 192 to assist the technician in sorting and organizing the protective garments 116. In other embodiments, the tag scanner 260 is provided as any type of device configured to electronically read an identification device. Moreover, in other embodiments, the computer 264 is any other suitable computing device such as a smartphone, tablet computer, and the like that electronically communicates over the Internet 112 and/or the computer network 164.

The computer network of FIG. 1 includes a non-transitory computer readable storage medium referred to herein as a memory 284 that is configured to store at least a file history 288 of each protection garment 116. The file history 288 includes electronic identification data (i.e. "ID data") 292, the x-ray image data 232, and annotation data 296. The ID data 292 includes the unique identifier 682 of the protective garment 116 and any other pertinent identification data. For example, in some embodiments, the ID data 292 includes a physical description of the garment 116 with data including a size of the garment 116, a color of the garment 116, and a type of the garment 116. The ID data 292 may also include the date the garment 116 was placed into service with the customer 108 and an expiration date of the garment 116. Moreover, the ID data 292 may include customer information regarding the garment 116, such as the customer name that owns and/or leases the garment 116, and the department name in which the customer utilizes the garment 116. Exemplary departments include operating room, catheterization laboratory (i.e. "cath lab"), cardiovascular operating room, radiology, interventional radiology, emergency room, oncology, and surgery center. Any other ID data 292, such as customer notes and recommendations, and technician notes and recommendations may be included in the file history 288.

In some embodiments, the file history 288 further includes a performance testing schedule that is used by the service provider 104 to determine when the garment 116 is due for a pass through the x-ray scanner system 200. The performance testing schedule may require radiation testing of the garment 116 every six months, for example. The time period of the performance testing schedule may be any other predetermined time period ranging from every month to every two years, for example. The performance testing schedule may also be based on usage of the garment 116. For example, the performance testing schedule may require performance testing of the garment 116 after every five sanitization processes (or any other suitable predetermined number of uses), as performed by the service provider 104.

Figure 5:
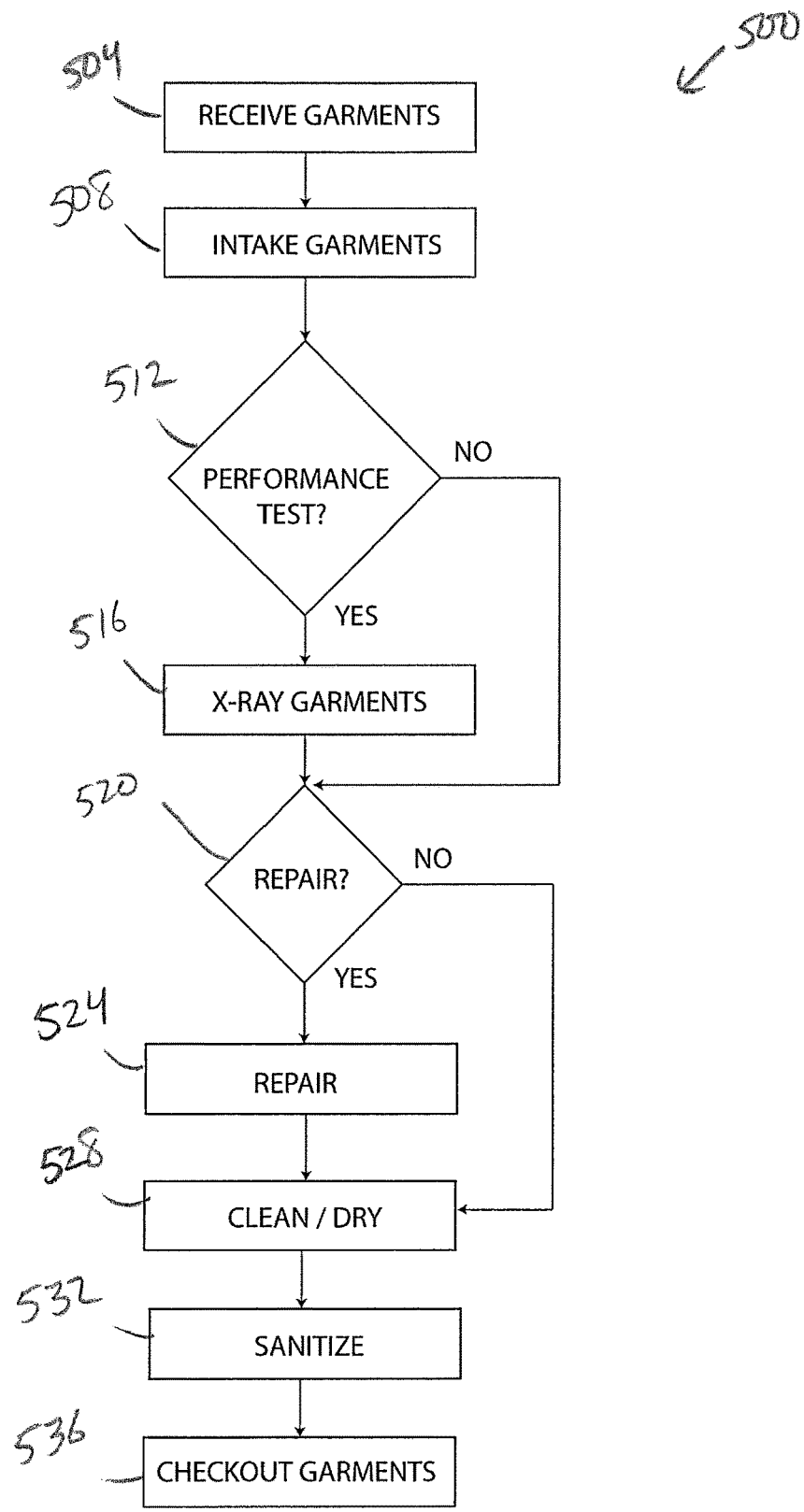
FIG. 5 is a flowchart illustrating an exemplary method of operating the system of FIG. 1.

In operation and with reference to the flowchart of FIG. 5, the system 100 is configured to implement a method 500 of processing a plurality of the radiation protection garments 116. Processing the garments 116 refers to at least cleaning and sanitizing the garments 116. Processing the garments 116 may also refer to performance testing and/or repairing the garments 116. At block 504, the service provider 104 receives the radiation protection garments 116. The garments 116 are typically either delivered to the service provider 104 by the customer 108 or by an agent of the customer 108, additionally or alternatively the service provider 104 may send a technician to the customer 108 to retrieve garments 116.

At block 508, the technician moves the received garments 116 to the intake area 140. At the intake area 140, the technician uses the tag scanner 168 to scan the ID tag 128 of each garment 116 having an ID tag 128. Upon scanning the ID tag 128, the tag scanner 168 and/or the computer 180 determines the unique identifier 682 of the garment 116. In particular, the technician uses the tag scanner 168 to scan the RFID 676 or the barcode 678 of the ID tag 128. Typically, the technician scans the RFID 676 of the ID tag 128 because it is faster to wave the garment 116 in front of the tag scanner 168 as compared to positioning the barcode 678 of the ID tag 128 for optical imaging. The computer 180 queries the memory 284 with the unique identifier 682 to locate the file history 288 for the garment 116 and information about the garment 116 is displayed on the display screen 188 by the GUI 192.

Figure 6:
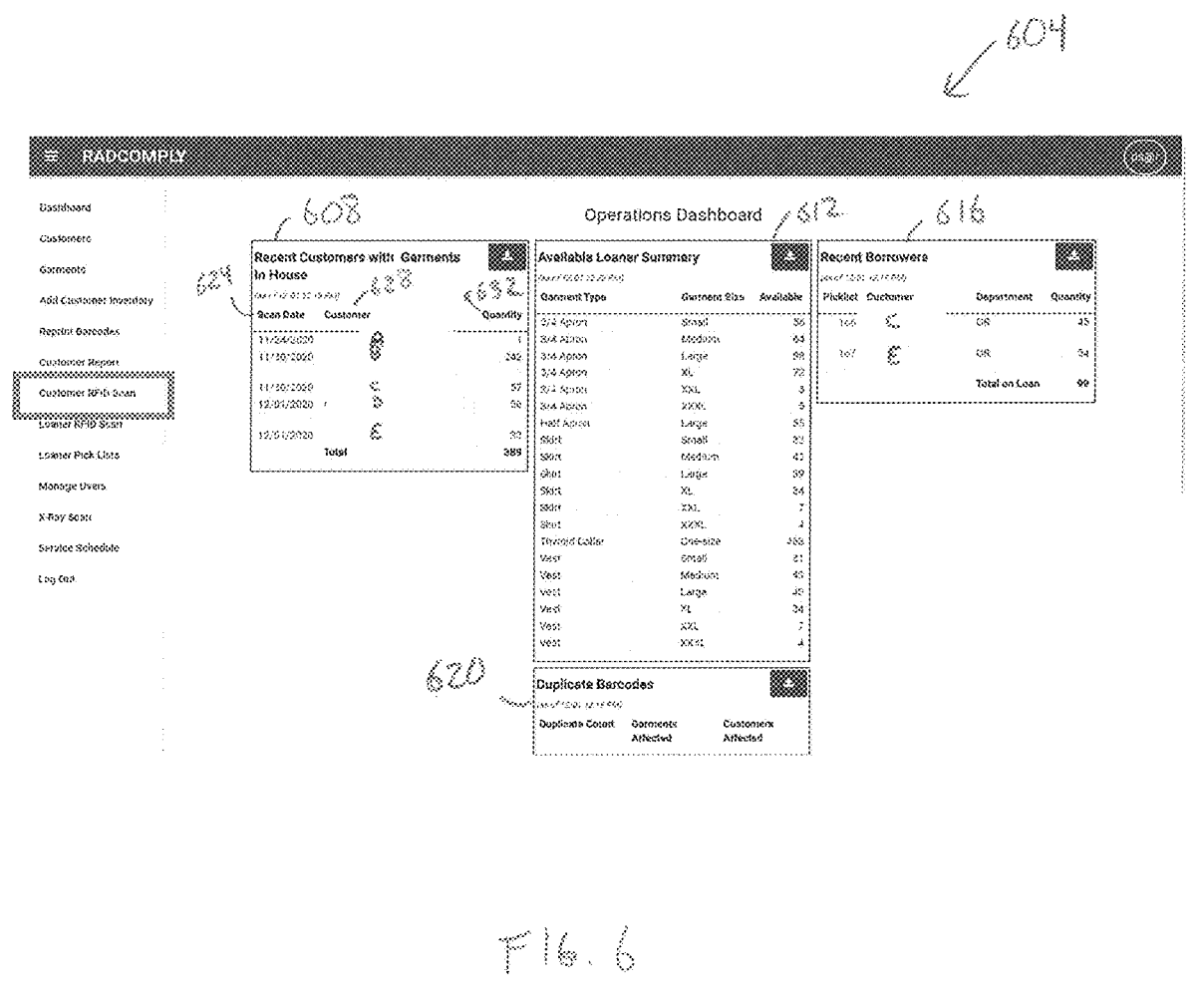

In a particular embodiment, as shown in FIG. 6, when beginning the scanning of garments 116, the GUI 192 displays an operations dashboard 604, that includes four blocks of data including (i) a recent customers block 608, (ii) an available loaner summary block 612, (iii) a recent borrowers block 616, and (iv) a duplicate barcodes block 620. The recent customers block 608 includes a scan date column 624 that identifies the most recent date on which a scan with the x-ray scanning system 200 was performed, a customer name column 628, and a quantity column 632 that identifies the number of garments 116 associated with the customer 108 on the most recent date of the scan date column 624. The available loaner summary block 612 includes a listing of the types of garments available for loaning to customers 108, the size of the garments 116, and the quantity of the available garments 116. The recent borrowers block 616 includes the names of customers 108 borrowing the garments 116, the departments in which the garments 116 were placed into service, and the quantity of borrowed garments 116. The duplicate barcode block 620 is a check to ensure that the scanned ID tags 128 each have a unique identifier 682. Garments 116 having duplicate unique identifiers 682, as may occur in error, are identified are identified in the duplicate barcode block 620.

Figure 7:
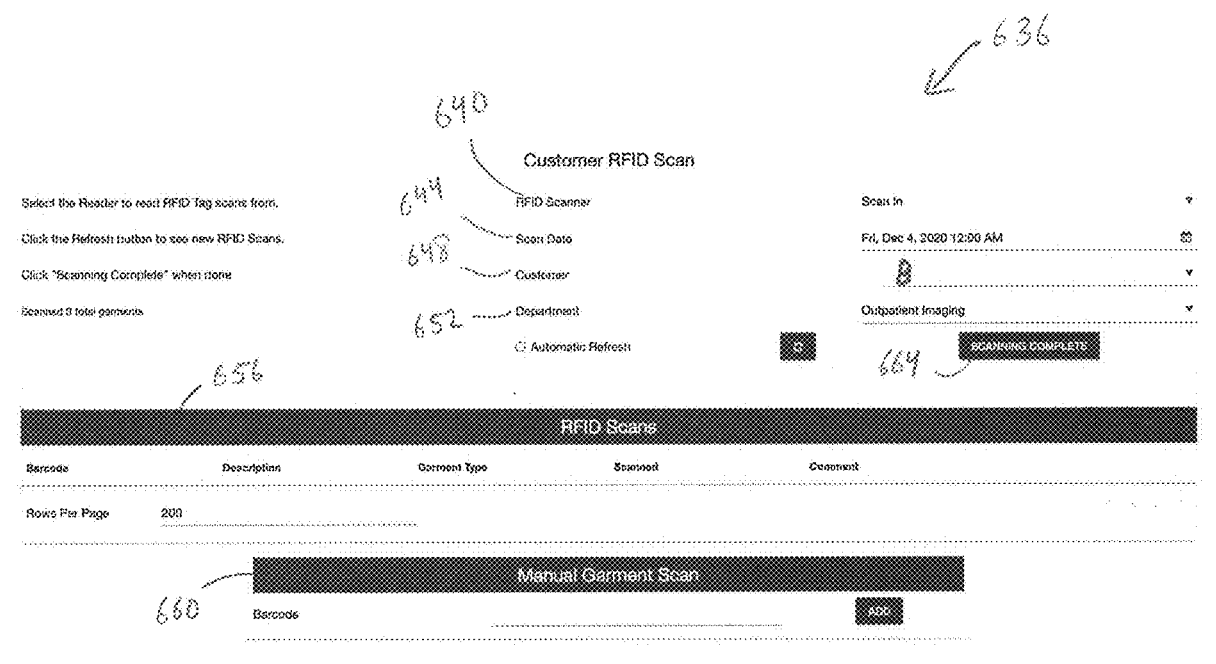

As shown in FIG. 7, the technician transitions the GUI 192 from the operations dashboard 604 to a Customer RFID Scan window 636 when the technician is ready to scan the ID tags 128. The Customer RFID Scan window 636 includes information to assist the technician in "checking in" the garments 116. To perform the check in, the technician selects "Scan In" in the RFID Scanner field 640. The Scan Date field 644 identifies the date of the check in, the Customer field 648 identifies the customer name, the Department field 652 identifies the department.

The Customer RFID Scan window 636 of the GUI 192 also includes an RFID Scans block 656 and a Manual Garment Scan block 660. The RFID Scans block 656 displays columns of data including the barcode 678, the description, the garment type, and any comments of each garment 116 that is scanned with the tag scanner 168. Each time the technician scans an ID tag 128, the corresponding ID data 292 is added to a row of the RFID Scans block 656. The Manual Garment Scan block 660 enables the technician to manually scan a garment 116 using the barcode 678 of the ID tag 128 or to manually type in the identifier 682. When the technician has scanned all of the incoming garments 116, the technician presses the "scanning complete" button 664 to complete the intake process.

Moreover, when the ID tags 128 of garments 116 are scanned by the tag scanner 168 at the intake area 140, the computer network 164 updates the file histories 288 of the garments 116 in real time to indicate that the garments 116 are located at the service provider 104 and are no longer located with the customer 108. In one embodiment, the file history 288 of the scanned garments 116 is updated to identify the location of the garment 116 each time the ID tag 128 is scanned by the service provider 104 or the customer 108.

In some instances, a garment 116 will be received by the service provider 104 that does not include one of the ID tags 128. The technician, in such a situation, uses the printer 172 and the lamination machine 176 to print and then to laminate a new ID tag 128 for the untagged garment 116. The technician permanently affixes the new ID tag 128 to the garment 116 by sewing, gluing, and/or any other fastening means.

Figure 8:
FIG. 8 is a further screenshot of the GUI of FIG. 6.

As show in FIG. 8, the GUI 192 displays information to assist the technician in preparing the ID tag 128 (see FIG. 9) and includes an Add Garments block 670 and a Print Preview block 674. In the Add Garments block 670, the customer name and department are entered and stored as part of the ID data 292 in the file history 288. The Add Garments block 670 also includes a description of the garment 116 including a garment type and the garment color. The Print Preview block 674 is a preview of the information printed on the ID tag(s) 128 including a preview of the barcode 678 and the unique identifier 682 of the garment 116. The Print Preview block 674 also includes a preview of the ID data 292, such as the customer name, the department, a garment description, and a garment color. The Add Garments block 670 and the Print Preview block 674 enable the technician to proofread the ID data 292 of the ID tag 128 and tends to reduce the number of wasted ID tags 128 that are printed in error.

FIG. 9 illustrates an exemplary ID tag 128 that is printed with the printer 172 and that is laminated with the lamination machine 176. The ID tag 128 includes the RFID 676 (shown in phantom), the barcode 678, the unique identifier 682, and ID data 292 such as the customer name, the department, and a description of the garment 116, including the garment type and the garment color.

Moreover, at block 508, the technician scanning the ID tag 128 inspects the garments 116 to identify garments 116 that are damaged and that require repairs. When a garment 116 requiring repairs is identified, the technician uses the input device 184 to update the file history 288 of the garment 116 to indicate that repairs are required and/or recommended. The technician may include notes or annotations (i.e. repair annotation data) identifying specific areas of the garment 116 that should be fixed. Additionally, the technician may group together the garments 116 requiring repairs for convenience and efficiency of processing the garments 116 through the service provider 104.

Next, at block 512 the technician determines if performance testing of the garment 116 is required. If performance testing is required the method 500 advances to block 516, and if performance testing is not required the method 500 advances to block 520.

In one embodiment, a subset of the garments 116 requiring performance testing is automatically identified by the computer network 164. Specifically, when the ID tag 128 is scanned by the technician, the computer 180 accesses the file history 288 of the scanned garment 116 and displays a notification on the GUI 192 or emits a corresponding sound that informs the technician that the garment 116 is due for performance testing. That is, the GUI 192 is configured to automatically identify the radiation protection garments 116 requiring performance testing to the technician. The computer network 164 determines that the garment 116 is due for performance testing based on the performance testing schedule. In one embodiment, the computer network 164 or the computer 180 determines a time duration between the last performance test (i.e. the last x-ray scan) and the current date. If the time duration is greater than the predetermined time period, then the GUI 192 is updated to inform the technician that a performance test is required.

The technician monitors the GUI 192 while scanning in the garments 116 using the tag scanner 168 and groups together all of the garments 116 requiring performance testing. In one embodiment, the technician may notice damage or inconsistencies in a garment 116, and the technician may manually flag the file history 288 of the garment 116 as requiring performance testing, even if the garment 116 is not currently due for testing. For example, if a garment 116 arrives heavily creased, crumpled, or folded, the attenuation material 126 of the garment 116 may be damaged. Specifically, hairline cracks, larger cracks, and other narrow defects 234 may result from mishandling the garments 116. Damage to the attenuation material 126 cannot be identified visually, and x-ray scanning is required to determine the extent, if any, of the damage.

With reference to block 516 of FIG. 5, the garments 116 requiring performance testing are moved to the x-ray area 144 and are performance tested using the x-ray scanner system 200. In particular, the subset of the garments 116 are scanned with the x-ray scanner system 200 to generate the x-ray image data 232. To this end, a garment 116 to be scanned is placed flat on the belt 224 so that the garment 116 is only one layer of the attenuation material 126 thick. The x-ray scanning system 200 is activated, which causes the belt 224 to advance the garment 116 through the housing 220 and under the imaging device 228. The imaging device 228 generates the x-ray imaging data 232 when the garment 116 is located thereunder. Moreover, date and time data of the x-ray scan are also generated when the garment 116 is scanned. The date and time data are included as the x-ray imaging data 232. The computer 204 saves the x-ray imaging data to the memory 284, such that the file history 288 and/or the ID data 292 of the garment 116 is automatically updated to include the corresponding x-ray image data 232 including a date and time record of each scan with the x-ray scanning system 200.

Next, the technician identifies defects 234, if any, in the garments 116 based on the x-ray image data 232. Typically, defects 234 in the radiation protection garments 116 are difficult and/or impossible to identify with the naked eye because the attenuation material 126 is covered by other layers of the garment 116. Accordingly, holes, tears, rips, openings, perforations, thin-spots, and the like (i.e. defects 234) in the attenuation material 126 cannot be identified simply by viewing or visually inspecting the garments 116 with the naked eye. The defects 234 are also highly difficult and/or impossible to detect by touching the garments 116. It is, however, important to identify these defects 234 because x-rays may be less attenuated or not attenuated at the spot of the defect 234, thereby allowing an undesirable level of radiation to contact the patient or wearer. Defects 234 of any size are dateable using the x-ray scanning system 200, including even the smallest of defects 234 (i.e. pinhole sized and hairline cracks).

Scanning the garments 116 with the x-ray scanner system 200 overcomes these difficulties, by generating the x-ray image data 232 and by displaying the images 238 based on the x-ray image data 232 on the display screen 212. In particular, and with reference again to FIG. 4, the images 238 displayed based on the x-ray image data 232 are a representation of the x-ray blocking and/or attenuation capabilities of the garment 116. The area 234 is plainly visible as failing to sufficiently block and/or attenuate x-rays; however, in viewing the garment 116 with the naked eye, the area 234 would be unidentifiable and would appear no different than the other portions of the garment 116, such as the areas 236. This is because the defect 234 in FIG. 4 is only in the attenuation material 126 and is not an opening or hole in the other layers of the garment 116.

When the images 238 based on the x-ray image data 232 are displayed on the display screen 212 in the GUI 192, the technician uses the input 208 to annotate the image 238 and/or the file history 288 with the annotation data 296 including information related to the defect(s). For example, upon viewing the image 238 of FIG. 4, the technician may include notes identifying the location of the defect 234, the size of the defect 234, and the severity of the defect 234. The technician may also include notes recommending repair or replacement of the garment 116 based on the identified defect 234. The notes of the technician are automatically saved to the file history 288 of the corresponding garment 116 (see comment field 728 of FIG. 11). That is, the file history 288 of the garment 116 is automatically updated with the annotation data 296.

The technician uses the input device 208 to zoom into the image 238 to identify even very small defects that are less than one square millimeter (1 mm$^2$). The annotation data 296 may include data corresponding to text descriptions, boxes, circles, and the like identifying the defects.

Additionally or alternatively, at block 516 defects in the garments 116 are automatically identified by a defect detection program that automatically generates the annotation data 296 and/or defect data. In particular, the x-ray image data 232 is processed through the defect detection program, which is programed to identify areas 234 of the scanned garments that (i) do not block x-rays, and (ii) are greater than a predetermined area. An exemplary predetermined area is one square inch (1 in$^2$) and ranges from ¼ in$^2$ to 5 in$^2$. The program operates by detecting the boundaries of the garment 116 in the image 238. The boundaries are detected by detecting the color or light intensity difference between the x-ray image data 232 corresponding to the garment 116 and the x-ray image data 232 corresponding to the background or the belt 224. Then the program detects color or light intensity differences within the boundaries of the garment 116. Generally, the color and/or light intensity of the x-ray image data 232 within the boundaries of the garment 116 is similar or substantially the same. Defects 234, however, typically appear in a different and/or contrasting color within the boundaries of the garment 116 and are quickly identified by the detect detection program. The defects 234 automatically identified by the defect detection program are stored in the memory 284 as defect data by the computer 204. The computer 204 is configured to automatically update the file histories 288 of the corresponding garments 116 with the defect data.

In a further embodiment, the defect detection program works in cooperation with the technician operating the x-ray scanning system 200. For example, the technician scans the garment 116 with the x-ray scanning system 200 to generate the x-ray image data 232. Then the defect detection program is run on the x-ray image data 232 to generate the defect data corresponding to automatically identified defects. Images based on the defect data are then displayed on the display screen 212. The technician uses the input device 208 to either "agree" or "disagree" with the displayed defect data. If the technician agrees with the defect data, then the file history 288 is automatically updated with corresponding annotation data 296 and/or defect data. If the technician disagrees with the defect data, then the file history 288 is not updated with the corresponding defect data.

In one embodiment, the method 500 includes transmitting the file history 288 including the x-ray image data 232, the ID data 292, and the annotation data 296 over the Internet 112 to a remote user, so that the remote user has immediate and/or real time access to at least selected portions of the file history 288. The remote user is typically the customer 108, but also includes any authorized person with access to the Internet 112. Typically, the customer 108 accesses the transmitted file history 288 using customer portal software 700 (FIG. 11) run on the client device 124. That is, the transmitted file history 288 is displayed on the display 132 of the client device 124 according to the customer portal software 700. The customer portal software 700 is configurable by the service provider 104 to provide the customer 108 with selected data from the file history 288. The customer 108 is typically provided with the data 232, 292, 296 of their own garments 116 and is prevented from accessing the data 232, 292, 296 associated with other customers 108.

In response to viewing the file history 288 on the display 132 through the customer portal software 700, the customer 108 (i.e. a remote user) may generate electronic instruction data for the service provider 104. For example, the x-ray image data 232 and the annotation data 296 may be displayed on the display 132 so that the customer 108 can view identified defects in the garments 116. The customer 108 uses the input 136 to generate instruction data requesting the service provider 104 to repair the defects or to dispose of the garment 116. The instruction data is transmitted over the Internet 112 and is stored in the file history 288 of the corresponding garments 116, so that the file history 288 is automatically updated in real time based on the instruction data. In one embodiment, the electronic instruction data includes instructions for the technician to repair, to replace, and/or to dispose of certain radiation protective garments 116.

Next, at block 520 the technician determines if any of the garments 116 require repairs before being cleaned and sanitized. If repairs are required the method 500 advances to block 524, and if repairs are not required the method 500 advances to block 528.

At block 524, the garments 116 requiring repairs are moved to the repair area 148 and a technician uses the comb 240 and/or the sewing machine 244 to repair the garments 116. Repairing the garments 116 includes replacing and/or repairing any broken or dirty fasteners. Repairing the garments 116 may also include patching any tears or rips in the outer layer of the garments 116. The technician accesses the file history 288 of the garments 116 to determine if the customer has made any repair requests or has provided any further instructions.

At block 528, the garments 116 are cleaned and dried at the cleaning and drying area 152. Cleaning the garments 116 includes cleaning and/or washing the garments 116 in the cleaning bay 248 to remove all debris and biofilm (i.e. contamination) from the garments 116. The garments 116 are dried with the drying equipment 252.

Next, at block 532, the garments 116 are sanitized at the sanitization area 156. Typically, all of the garments 116 that are received from the customer 108 are sanitized. The sanitization performed at block 532 includes applying the sanitizer solution 256 to all surfaces of the garments 116. In one embodiment, the sanitizer solution 256 is applied in liquid form and is sprayed onto the surfaces of the garment 116, with the garments 116 hanging from a support structure. The garments 116 sprayed with the sanitizer solution 256 are left undisturbed for a predetermined time period to allow the sanitizer solution 256 to achieve full effectiveness in sanitizing the garments 116.

At block 536 of the method 500, a checkout process is performed on the sanitized garments 116. In one embodiment, the checkout process includes a technician scanning the ID tags 128 of the sanitized garments 116 with the tag scanner 260 and viewing information provided by the GUI 192 on the display 272. For example, the GUI 192 displays portions of the file history 288, which includes packing instructions to assist the technician in preparing the garments 116 for delivery and/or pickup by the customer 108. The technician packs the garments 116 according to the packing instructions in the bins 276.

At the checkout area 160, in one embodiment, the technician uses the data from the file history 288, as displayed by the GUI 192, to group together the garments 116 having an identified defect 234 according to the x-ray image data 232 in a first group, and groups together the garments 116 without an identified defect 234 in a second group that is separate from the first group. In a specific example, at the checkout area 160, the technician scans the ID tag 128 of the garment 116, and GUI 192 provides packing instructions, including the customer name, department name (if any), and in which group of garments 116 the scanned garment 116 should be included. The technician working the checkout area 160 scans each garment 116 and groups together the garments 116 accordingly.

In one embodiment, when the ID tags 128 of the garments 116 are scanned with the tag scanner 260 during checkout, the computer network 164 updates the file histories 288 of the scanned garments 116 in real time (i) to indicate that the garments 116 are ready for pickup by the customer 108, or (ii) to include a delivery window that the customer 108 can expect to receive the garments 116. As noted above, the service provider 104 and the customer 108 may each access the file histories 288 of the garments 116 to easily determine the present location of each garment 116. Thus, for example, the customer 108 uses the client device 124 to determine which of the garments 116 are located at the service provider 104 and which other of their garments 116 are located at their facility. The service provider 104 is also able to determine the location of the garments 116 as located at either the service provider 104 facility or at the customer 108 facility using the file history 288.

Figure 10:
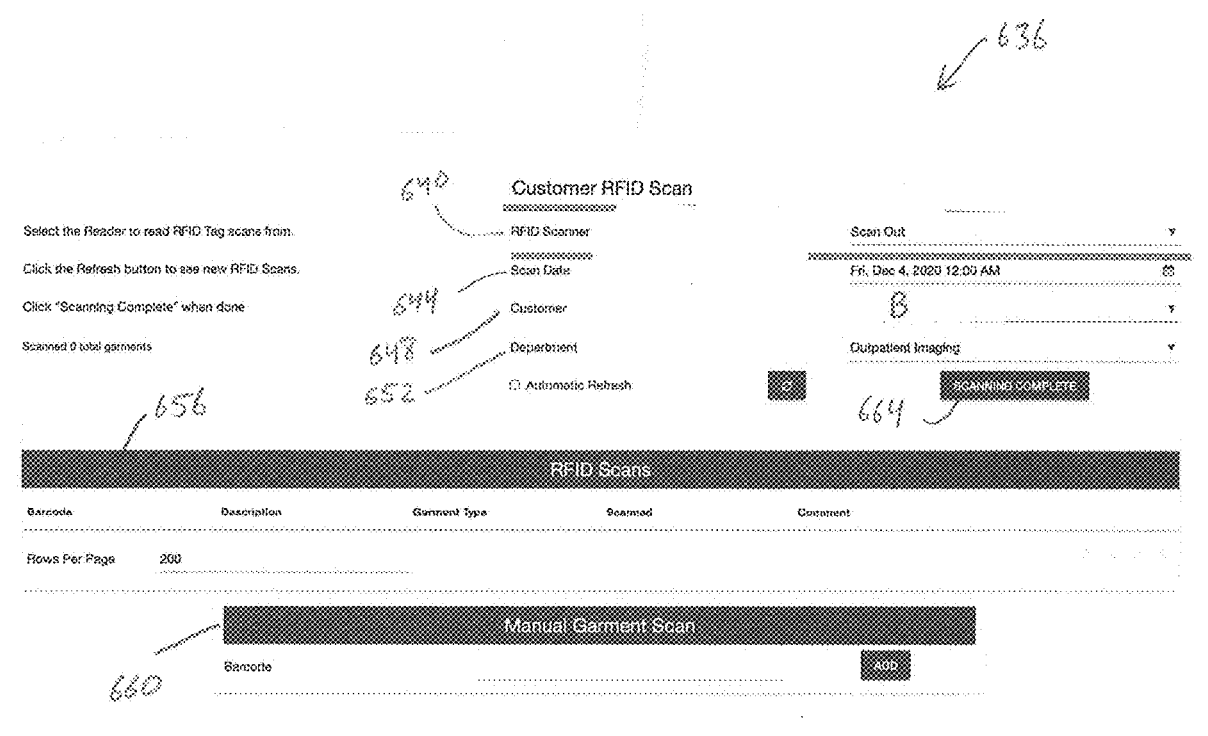

As shown in FIG. 10, when checking out the garments 116, the GUI 192 displays the Customer RFID Scan window 636 and the technician selects "Scan Out" in the RFID Scanner field 640. Each time the technician scans an ID tag 128, the corresponding ID data 292 is added to the fields 644, 648, 652. When the technician has scanned and grouped all of the outgoing garments 116, the technician presses the scanning complete button 664 to complete the checkout process.

Next, the customer 108 receives the sanitized garments 116 separated according to the first group that includes defects 234 and the second group that does not include the defects 234. The garments 116 are received by the customer 108 in separate groups so that the customer 108 can determine easily the garments 116 identified as having defects 234 by the x-ray image data 232. In one embodiment, the customer 108 scans the ID tags 128 of the newly-received garments 116 to update the file histories 288 of the garments 116 as being located at the customer facility.

Figure 11:
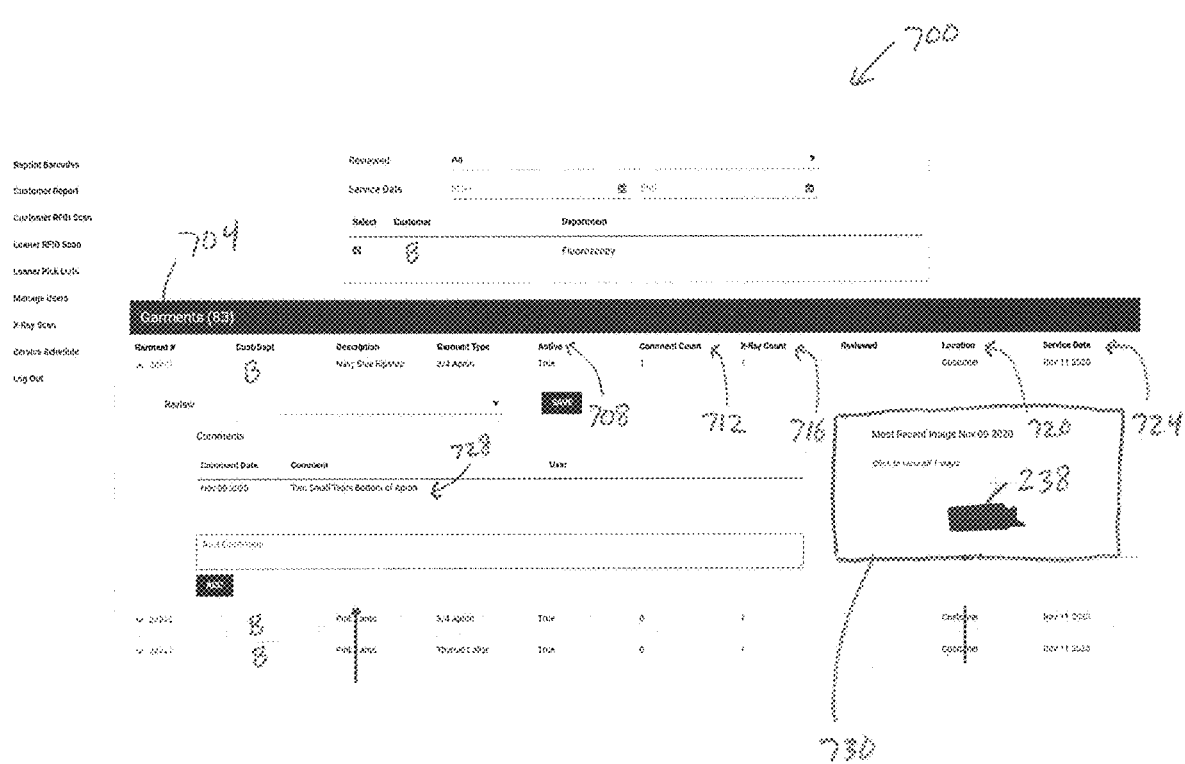
FIG. 11 is a screenshot of a customer portal used by the customer of FIG. 1.

As shown in FIG. 11, a screenshot of the customer portal software 700 includes a Garments block 704 that includes garment information including an Active column 708, a Comment Count column 712, an X-Ray Count column 716, a Location column 720, and a Service Date column 724. The information in the Garments window 704 can be sorted by the data in any of the columns (including columns 708, 712, 716, 720, 724), and is sourced from the file history 288 of the garments 116. The Active column 708, identifies when the garment 166 is being used by the customer 108 or when the garment 116 has been removed from service. The customer portal software 700 identifies a garment 116 that is actively in service as True, and a garment 116 that is not in service is identified as False. The Comment Count column 712 is a count of the comments entered into the comment field 728. The data of the Comment Count column 712 is incremented with each comment in the comment field 728 and is decremented when comments are deleted from the comment field 728. The X-Ray Count column 716 is a count of the total number of times that the garment 116 has been scanned through the x-ray scanning system 200. The data of the X-Ray Count column 716 is incremented each time that the garment 116 is scanned through the x-ray scanning system 200 in real time. The Location column 720 identifies the current location of the garment 116 as being with either the customer 108 or the service provider 104. The data of the Location column 720 is updated in real time based on location of the garment 116 when the ID tag 128 is scanned. For example, when the client device 124 is used to scan the garment 116, the Location column 720 is updated in real time to include the data "Customer." When the tag scanner 168 is used to scan the garment 116, the Location column 720 is updated in real time to include the data "Service Provider." When the tag scanner 260 is used to scan the garment 116, the data of the Location column 720 is updated to include the data "In Transit," or "Customer" depending on the preferences of the customer 108 and/or the service provider 104. The Service Date column 724 identifies the date that the garment 116 was first placed into service with the customer 108. The Service Data column 724 enables the customer 108 to easily identify and sort the oldest and newest garments 116 by service date.

In FIG. 11, the customer portal software 700 also includes an image preview block 730 that provides quick access to the most recent images 238 of the garment 116. The image preview block 730 is updated in real time with the images 238 of the garment 116 that are generated based on the x-ray image data 232. As shown, the image preview block 730 provides the date that the image 238 was generated and a preview of the image 238. When the user selects the preview image 238, the full image is downloaded and displayed on the client device similar to the view of FIG. 4 so that the customer can zoom in an view any corresponding defects 234 in high resolution and with high detail.

The system 100 and method 500 offer several technical improvements to the processing of radiation protection garments 116. First, the system 100 and method 500 provide the sanitized garments 116 to the customer 108 in groups separated according to the detection of the defect(s) 234. Detection of the defects 234 according to the method 500 is fast and accurate; whereas, the customer 108 typically does not possess the equipment needed to easily identify the defects 234. As noted, the defects 234 are in the attenuation material 126 and cannot be identified with the naked eye. Also, the customer 108 typically does not have direct access to the x-ray scanner system 200, which generates the x-ray image data 232 quickly and accurately. Instead, the customer 108 typically uses a different x-ray scanning system to attempt to identify defects through a laborious process that is (i) time consuming, and (ii) potentially exposes the technician to unacceptable levels of radiation. The system 100 and method 500 solve both of these issues.

The system 100 and method 500 provide the customer 108 with the x-ray image data 232 so that the customer 108 can determine if the garments 116 with defects 234 are suitable for further service simply by clicking through the images 238 of the defects 234 on the client device 124. In one example, the service provider 104 does not determine if the garments 116 with defects 234 are suitable for further service, because there are presently no uniform rules or standards to apply in determining the suitability of a radiation protection garment 116. Instead, the service provider 104 provides the customer 108 with the information needed for the customer 108 to quickly and easily self-determine and/or self-audit if the garments 116 are suitable for further service.

In an exemplary use case, the customer 108 receives the group of garments 116 identified as having defects 234, and then uses the client device 124 to view images 238 of the garments 116 based on the x-ray image data 232. The customer 108 applies their own standards to determine if the defect 234 is significant enough to warrant discarding the garment 116, repairing the garment 116, or replacing the garment 116. The customer 108 updates the file history 288 of the garment 116 with their decision so that the service provider 104 can take further action, if needed, the next time that the garment 116 is processed.

As another technical improvement, the system 100 and method 500 provide the customer 108 with real time access to the data of the file history 288, which is useful for the customer 108 to audit their inventory of garments 116. As used herein "real time access" refers to making available the data of the file history 288 to the customer 108 as soon as the data is stored in the memory 284 or with only a minimal delay from when the data is stored in the memory 284. In a typical customer setting, the garments 116 can be swapped or exchanged between departments, thereby creating difficulty in determining the location of the garments 116 within the customer facility. The system 100 and method 500 assist the customer 108 in managing the garment 116 inventory in at least two ways. First, the customer 108 scans the barcode 678 of the ID tags 128 of the garments 116 with the client device 124 to access the file history 288 and to determine the department in which the garment 116 belongs. Second, the customer 108 uses the client device 124 to access the file history 288 of any garment 116 associated with the customer 108, and to determine the location of any of the garments 116, including missing garments 116. The file history 288 informs the customer 108 if the garment 116 is located with the customer 108 or with the service provider 104.

The system 100 and method 500 also provide a technical improvement in auditing the garments 116 by keeping an accurate and updated file history 288 for each garment 116. For example, some garments 116 may have a predetermined expiration date. The expiration date and the date the garment 116 was placed into service is part of the file history 288, and the customer 108 can automatically remove and replace garments 116 as they expire, thereby ensuring the customer 108 utilizes garments 116 that are unexpired and that are in compliance with any applicable rules and regulations.

As shown in FIG. 12, another image 238 based on the x-ray image data 232 is displayed on the display screen 212. The x-ray image data 232 corresponds to a digital x-ray image 238 of the protection garment 116. In viewing the GUI 192 and the image 238, areas 236 of the protection garment 116 that block or attenuate x-rays are identified and easily distinguished from defects 234 of the protection garment 116 that fail to block x-rays. In FIG. 12, the defects 234 are tears or cracks in the attenuation material 126 of the garment 116. The defects 234 in FIG. 12 are not visible with the naked eye, instead the defects 234 represent regions of the garment 116 that pass x-rays from the imaging device 228 or that fail to sufficiently attenuate x-rays from the imaging device 228.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for processing a plurality of radiation protective garments comprising:
   receiving a plurality of radiation protective garments from a customer;
   scanning an identification tag of each received radiation protective garment to identify electronic identification data of each radiation protective garment;
   automatically identifying a subset of the radiation protective garments that require performance testing by using the identification data to access a file history of each scanned radiation protective garment, the file history including a performance testing schedule;
   using an x-ray scanning system to scan the subset of the radiation protective garments and to generate x-ray image data;
   automatically updating the file histories of the subset of the radiation protective garments to include the corresponding x-ray image data;
   identifying defects in the corresponding radiation protective garment based on the x-ray image data;
   sanitizing the plurality of radiation protective garments;
   grouping the sanitized radiation protective garments identified as having defects in a first group;
   grouping the sanitized radiation protective garments without identified defects in a second group separate from the first group; and
   returning the plurality of radiation protective garments to the customer separated according to the first group and the second group.

2. The method as claimed in claim 1, further comprising:
   transmitting the x-ray image data to a client device used by the customer over a computer network; and
   displaying images based on the x-ray image data on the client device to display the identified defects in the corresponding radiation protective garments of the first group.

3. The method as claimed in claim 1, wherein the identifying defects comprises:
   displaying images based on the x-ray image data on a display screen;
   using an input device to generate annotation data that identifies defects in the corresponding radiation protective garment as displayed on the display screen; and
   automatically updating the file histories of the corresponding radiation protective garments with the annotation data.

4. The method as claimed in claim 3, further comprising:
   transmitting the x-ray image data and the annotation data to a client device used by the customer over a computer network; and
   displaying images based on the x-ray image data and the annotation data on the client device to display the identified defects in the corresponding radiation protective garments of the first group.

5. The method as claimed in claim 1, wherein the identifying defects comprises:
   automatically identifying defects in the subset of the radiation protective garments by processing the x-ray image data through a defect detection program, the defect detection program generates defect data corresponding to regions of the radiation protective garments that (i) do not block x-rays, and (ii) are greater than a predetermined area; and
   automatically updating the file histories of the corresponding radiation protective garments with the defect data.

6. A method for processing a plurality of radiation protective garments comprising:
   scanning an identification tag of each radiation protective garment of the plurality of radiation protective garments to identify electronic identification data of each radiation protective garment;
   automatically identifying a subset of the radiation protective garments that require performance testing by using the identification data to access a file history of each scanned radiation protective garment, the file history including a performance testing schedule;
   configuring a graphical user interface to identify the radiation protective garments of the subset of the radiation protective garments to a technician;
   using an x-ray scanning system to scan the subset of the radiation protective garments and to generate x-ray image data;
   automatically updating the file histories of the subset of the radiation protective garments to include the corresponding x-ray image data;
   displaying images based on the x-ray image data on a display screen;

using an input device to generate annotation data that identifies defects in the corresponding radiation protective garment as displayed on the display screen;
automatically updating the file histories of the corresponding radiation protective garments with the annotation data;
transmitting at least the identification data, the x-ray image data, and the annotation data over the Internet to a remote user, so that the remote user has immediate access to the identification data, the x-ray image data, and the annotation data;
receiving electronic instruction data from the remote user, the instruction data having instructions to repair, to replace, and/or to dispose of certain radiation protective garments of the plurality of radiation protective garments; and
automatically updating the file history based on the instruction data.

7. The method as claimed in claim 6, further comprising:
grouping the radiation protective garments identified as having defects according to the annotation data in a first group; and
grouping the radiation protective garments without identified defects in a second group separate from the first group.

8. The method as claimed in claim 6, further comprising:
updating the file histories of each scanned radiation protective garment to include a location of the radiation protective garments when the identification tag is scanned.

9. The method as claimed in claim 6, further comprising:
inspecting the radiation protective garments to identify radiation protective garments requiring repairs;
repairing the radiation protective garments requiring repairs;
cleaning each radiation protective garment of the plurality of radiation protective garments; and
sanitizing the cleaned radiation protective garments.

10. The method as claimed in claim 9, wherein the identification data includes a unique identifier, a customer name, a department name in which the customer utilizes the radiation protective garment, and a physical description of the radiation protective garment.

11. The method as claimed in claim 10, further comprising:
scanning the identification tag of the sanitized radiation protective garments;
displaying images based on the identification data on a display screen including the customer name and the department name,
grouping the sanitized radiation protective garments according to the displayed images based on the identification data.

12. The method as claimed in claim 6, further comprising:
generating date and time data each time one of the radiation protective garments is scanned with the x-ray scanning system; and
updating the file history of the corresponding radiation protective garment to include the date and time data, so that the file history includes a date and time record of each scan with the x-ray scanning system.

13. A method for processing a plurality of radiation protective garments comprising:
scanning an identification tag of each radiation protective garment of the plurality of radiation protective garments to identify electronic identification data of each radiation protective garment;
automatically identifying a subset of the radiation protective garments that require performance testing by using the identification data to access a file history of each scanned radiation protective garment, the file history including a performance testing schedule;
configuring a graphical user interface to identify the radiation protective garments of the subset of the radiation protective garments to a technician;
using an x-ray scanning system to scan the subset of the radiation protective garments and to generate x-ray image data;
automatically updating the file histories of the subset of the radiation protective garments to include the corresponding x-ray image data and the date and time of the x-ray scanning;
automatically identifying defects in the subset of the radiation protective garments by processing the x-ray image data through a defect detection program, the defect detection program generates defect data corresponding to regions of the radiation protective garments that (i) do not block x-rays, and (ii) are greater than a predetermined area;
automatically updating the file histories of the corresponding radiation protective garments with the defect data;
cleaning the plurality of radiation protective garments by removing contamination from the radiation protective garments;
sanitizing the cleaned radiation protective garments by applying a sanitizer solution to all surfaces of the radiation protective garments;
scanning the identification tag of each sanitized radiation protective garment to identify the electronic identification data and to determine packing instructions; and
packing the sanitized radiation protective garments according to the packing instructions.

14. The method according to claim 13, further comprising:
displaying images based on the x-ray image data on a display screen;
using an input device to generate annotation data that identifies defects in the corresponding radiation protective garment as displayed on the display screen;
automatically updating the file histories of the corresponding radiation protective garments with the annotation data.

15. The method as claimed in claim 14, further comprising:
transmitting the x-ray image data and the annotation data to a client device over a computer network; and
displaying images based on the x-ray image data on the client device to display the identified defects in the corresponding radiation protective garments.

16. The method as claimed in claim 15, further comprising:
grouping the radiation protective garments identified as having defects according to the annotation data in a first group; and
grouping the radiation protective garments without identified defects in a second group separate from the first group.

17. The method as claimed in claim 16, further comprising:
returning the plurality of radiation protective garments to a customer separated according to the first group and the second group.

* * * * *